United States Patent
Matsumoto et al.

(10) Patent No.: US 12,447,717 B2
(45) Date of Patent: Oct. 21, 2025

(54) MULTILAYERED BODY AND METHOD FOR MANUFACTURING SAME

(71) Applicant: Mitsubishi Gas Chemical Company, Inc., Tokyo (JP)

(72) Inventors: Nobuhiko Matsumoto, Hiratsuka (JP); Jin Nakamura, Hiratsuka (JP); Yuuki Sato, Hiratsuka (JP); Atsushi Sakai, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 344 days.

(21) Appl. No.: 17/601,375

(22) PCT Filed: Mar. 4, 2020

(86) PCT No.: PCT/JP2020/009218
§ 371 (c)(1),
(2) Date: Oct. 4, 2021

(87) PCT Pub. No.: WO2020/203006
PCT Pub. Date: Oct. 8, 2020

(65) Prior Publication Data
US 2022/0203651 A1 Jun. 30, 2022

(30) Foreign Application Priority Data
Apr. 5, 2019 (JP) .................. 2019-072709

(51) Int. Cl.
*B32B 7/04* (2019.01)
*B32B 3/30* (2006.01)
(Continued)

(52) U.S. Cl.
CPC ................. *B32B 7/04* (2013.01); *B32B 3/30* (2013.01); *B32B 15/088* (2013.01); *B32B 15/09* (2013.01);
(Continued)

(58) Field of Classification Search
None
See application file for complete search history.

(56) References Cited

U.S. PATENT DOCUMENTS

| | | |
|---|---|---|
| 2010/0304065 A1 | 12/2010 | Tomantschger et al. |
| 2012/0207982 A1 | 8/2012 | Toshihiro et al. |

(Continued)

FOREIGN PATENT DOCUMENTS

| | | |
|---|---|---|
| CN | 102438820 A | 5/2012 |
| CN | 102574362 A | 7/2012 |

(Continued)

OTHER PUBLICATIONS

Machine Translation of JP2015030260 (Year: 2015).*

(Continued)

*Primary Examiner* — Shawn McKinnon
(74) *Attorney, Agent, or Firm* — Fitch, Even, Tabin & Flannery LLP

(57) ABSTRACT

To provide a multilayered body with high adhesion between a resin layer containing a nanofiber or the like and a metal layer, and a method for manufacturing a multilayered body. The multilayered body contains: a metal layer having an uneven region with an average length (RSm) of a contour curve element from 0.5 to 10 μm; and a resin layer in contact with the uneven region of the metal layer, the resin layer containing a thermoplastic resin and a fibrous filler, the fibrous filler having a number average fiber diameter (F) of less than 1 μm, and a ratio (RSm/F) of the average length (RSm) of the contour curve element of the uneven region to the number average fiber diameter (F) from 1 to 20000.

13 Claims, 2 Drawing Sheets

(51) Int. Cl.
  *B32B 15/088* (2006.01)
  *B32B 15/09* (2006.01)
(52) U.S. Cl.
  CPC ..... *B32B 2250/02* (2013.01); *B32B 2262/106* (2013.01); *B32B 2307/732* (2013.01)

(56) References Cited

U.S. PATENT DOCUMENTS

| | | |
|---|---|---|
| 2015/0111673 A1 | 4/2015 | Tomantschger et al. |
| 2015/0273795 A1 | 10/2015 | Koizumi et al. |
| 2016/0221301 A1 | 8/2016 | Okumura et al. |
| 2016/0303820 A1 | 10/2016 | Takihana et al. |
| 2018/0085977 A1 | 3/2018 | Ezaki |
| 2021/0245474 A1 | 8/2021 | Okumura et al. |

FOREIGN PATENT DOCUMENTS

| | | |
|---|---|---|
| CN | 104736337 A | 6/2015 |
| CN | 105517795 A | 4/2016 |
| CN | 105829096 A | 8/2016 |
| CN | 107708998 A | 2/2018 |
| JP | 2010-131888 A | 6/2010 |
| JP | 2011-156764 A | 8/2011 |
| JP | 2015-030260 A | 2/2015 |
| JP | 2016-043526 A | 4/2016 |
| JP | 2016-087836 A | 5/2016 |
| JP | 2018-177867 A | 11/2018 |
| WO | 2011/045895 A1 | 4/2011 |
| WO | 2014/061520 A1 | 4/2014 |

OTHER PUBLICATIONS

CNIPA; Application No. 202080026290.0; Office Action dated Nov. 2, 2022, 9 pages.
International Preliminary Report on Patentability and Written Opinion for PCT/JP2020/009218, mailed May 19, 2020, and English Translation submitted herewith (9 pages).
International Search Report for PCT/JP2020/009218, mailed May 19, 2020, and English Translation submitted herewith (5 pages).
Extended European Search Report issued in corresponding European Application No. 20784737.7 on Apr. 8, 2022 (7 pages).

* cited by examiner

MULTILAYERED BODY AND METHOD FOR MANUFACTURING SAME

CROSS-REFERENCE TO RELATED APPLICATIONS

This application is a U.S. national phase application filed under 35 U.S.C. § 371 of International Application Number PCT/JP2020/009218, filed Mar. 4, 2020, designating the United States, which claims priority from Japanese Application Number 2019-072709, filed Apr. 5, 2019.

Field of the Invention

The present invention relates to a multilayered body including a resin layer and a metal layer, and a method for manufacturing a multilayered body.

Background of the Invention

A technique to increase the strength and rigidity of a resin layer by including reinforcing fibers in a thermoplastic resin has been available. A resin molded article of this type is referred to as, for example, a fiber-reinforced plastic and is applied to various products ranging from building materials, automotive components, stationery, household goods, to semiconductor-related components.

On the other hand, such a fiber-reinforced resin layer may have a tendency to bond to a metal layer. Typically, a resin layer and a metal layer may greatly differ in material, which makes it difficult to secure adhesion, and research and development are underway to improve the adhesion.

For example, Patent Document 1 discloses a multilayered body having a metal layer and a carbon fiber-reinforced polyamide resin layer on a surface of the metal layer, in which the carbon fiber-reinforced polyamide resin contains from 5 to 300 parts by weight of a carbon fiber (B) relative to 100 parts by weight of a polyamide resin (A) including diamine units and dicarboxylic acid units; 70 mol % or greater of the diamine units are derived from xylylenediamine; and 70 mol % or greater of the dicarboxylic acid units are derived from sebacic acid.

Patent Document 2 discloses a polyamide resin composition for metal bonding, the composition containing from 30 to 90 parts by mass of a polyamide resin, from 70 to 10 parts by mass of a reinforcing filler, and talc, in which the polyamide resin composition for metal bonding contains the talc in a proportion from 0.1 to 10 mass %; and in the polyamide resin, $Tm \le 290°$ C., $Tm-Tcc \ge 28°$ C., and $0\ J/g < \Delta Hm \le 55\ J/g$, where Tm is melting point of the polyamide resin, Tcc is crystallization temperature at temperature drop, and $\Delta Hm$ is enthalpy of fusion.

CITATION LIST

Patent Documents

Patent Document 1: JP 2016-043526 A
Patent Document 2: JP 2018-177867 A

SUMMARY OF INVENTION

The techniques described in Patent Documents 1 and 2 can improve the adhesion between a resin layer containing a fibrous filler and a metal layer. However, further improvement is required when a fine filler, such as a nanofiber, is used as a fibrous filler.

Thus, an object of the present invention is to solve the problems described above and to provide a multilayered body with increased adhesion between a resin layer containing a fine fibrous filler and a metal layer, and a method for manufacturing a multilayered body.

As a result of diligent studies conducted for the above problems, the present inventor found that, when a fine fibrous filler is used, the above problems can be solved by adjusting a ratio of a number average fiber diameter of the fibrous filler to an average length (RSm) of a contour curve element of the metal layer. Specifically, the above problems can be solved by the following means.

(1) A multilayered body including a metal layer having an uneven region with an average length (RSm) of a contour curve element from 0.5 to 10 μm, and a resin layer in contact with the uneven region of the metal layer, the resin layer containing a thermoplastic resin and a fibrous filler, the fibrous filler having a number average fiber diameter (F) of less than 1 μm, and the fibrous filler having a ratio (RSm/F) of the average length (RSm) of the contour curve element of the uneven region to the number average fiber diameter (F) from 1 to 20000.

(2) The multilayered body according to (1), the uneven region in the metal layer having a maximum height roughness (Rz) from 0.2 to 5 μm.

(3) The multilayered body according to (1) or (2), wherein, for a width (D2) of a resin filling a recessed part of the uneven region along a line drawn parallel to a metal surface at a point ¼ of a height of the resin from a bottom, D2 is greater than an opening diameter (D1) of the recessed part (D2>D1).

(4) The multilayered body according to any one of (1) to (3), wherein the fibrous filler contains at least one selected from the group consisting of carbon nanofibers, single-walled carbon nanotubes, multi-walled carbon nanotubes, cellulose nanofibers and carbon nanohorns.

(5) The multilayered body according to any one of (1) to (4), wherein the resin constituting the resin layer is at least one selected from the group consisting of polyamide resins, polyimide resins, and polycarbonate resins.

(6) The multilayered body according to any one of (1) to (5), wherein the ratio (RSm/F) is from 10 to 5000.

(7) The multilayered body according to any one of (1) to (6), wherein a content of the fibrous filler in the resin layer is from 5 to 60 mass %.

(8) A method for manufacturing a multilayered body, the method including applying a resin composition containing a thermoplastic resin and a fibrous filler to a metal layer having an uneven region with an average length (RSm) of a contour curve element from 0.5 to 10 μm, so that the resin composition is brought into contact with the uneven region of the metal layer, the fibrous filler having a number average fiber diameter (Fm) of less than 1 μm, and the fibrous filler having a ratio (RSm/Fm) of the average length (RSm) of a contour curve element of the uneven region to the number average fiber diameter (Fm) from 1 to 20000.

The present invention has made it possible to provide the multilayered body with increased adhesion between the resin layer containing a nanofiber or the like and the metal layer, and the method for manufacturing the multilayered body.

DESCRIPTION OF EMBODIMENTS

Figure 1:
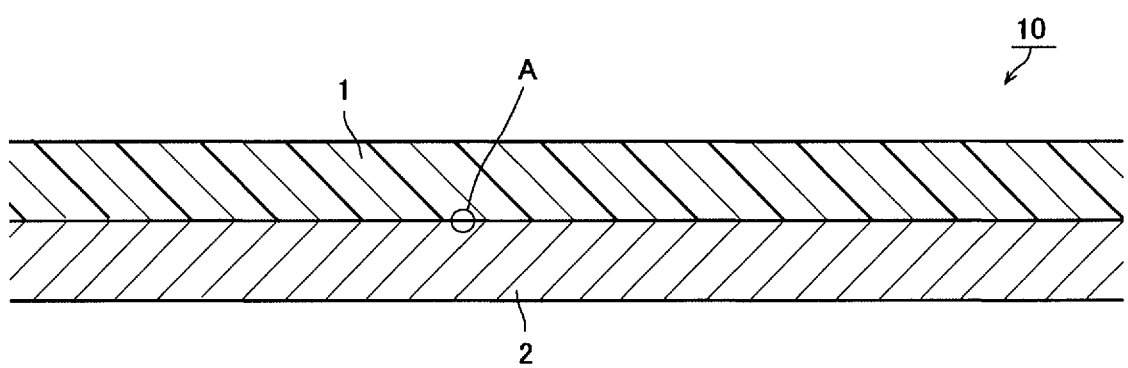
FIG. 1 is a cross-sectional view schematically illustrating a portion of a multilayered body according to a preferred embodiment of the present invention.

Contents of the present invention will be described in detail below. In the present specification, "from . . . to . . ." or "of . . . to . . ." is used to mean that the numerical values described before and after "to" are included as the lower limit and the upper limit, respectively.

A multilayered body of the present invention is characterized by including a metal layer having an uneven region with an average length (RSm) of a contour curve element from 0.5 to 10 μm, and a resin layer in contact with the uneven region of the metal layer, the resin layer containing a thermoplastic resin and a fibrous filler, the fibrous filler having a number average fiber diameter (F) of less than 1 μm, and the fibrous filler having a ratio (RSm/F) of the average length (RSm) of the contour curve element of the uneven region to the number average fiber diameter (F) from 1 to 20000.

Adopting such a configuration increases adhesion between the resin layer and the metal layer. The reason for that involves some assumption but is presumed as follows. That is, in the present invention, a fibrous filler that is sufficiently fine relative to the unevenness of the metal layer is used. Thus, the fibrous filler is presumed to be able to maintain its high fluidity when the resin layer is molded and to sufficiently fill together with the resin into a recessed part of the metal layer. Furthermore, an oxide film is formed on the surface of the metal layer over time, and an oxide film is also formed on the surface of the recessed part when the surface of the metal layer is bonded to the resin. That is, the internal volume of the recessed part is also reduced over time. In other words, the internal volume of the recessed part of the metal layer decreases in a state where the resin layer has filled the recessed part, and thus the metal layer and the resin layer are presumed to be more firmly bonded. Such an effect due to the oxide film is increased presumably by the small number average fiber diameter of the fibrous filler and also the small opening of the recessed part in the first place. This is particularly effective when a width (D2) of the resin along a line drawn parallel to the metal surface described below is greater than an opening diameter (D1) of the recessed part (D2>D1).

The present invention will be described in detail below with reference to the drawings. Of course, the present invention is not limited to the configurations in the drawings.

FIG. 1 is a cross-sectional view schematically illustrating a portion of a multilayered body according to a preferred embodiment of the present invention. The multilayered body 10 of the present embodiment has a structure in which the resin layer 1 and the metal layer 2 are layered. The present invention is not to be construed as being limited to this form, and the multilayered body 10, as long as has an interface (bonded surface) in contact with the uneven region of the resin layer 1 and the metal layer 2 in a part of the body, may have a structure in which both layers are molded into other forms. In addition, the multilayered body may have an additional layer on the outside of the resin layer or the outside of the metal layer. Such examples include a structure in which the resin layer and the metal layer are alternately multilayered.

Figure 2:
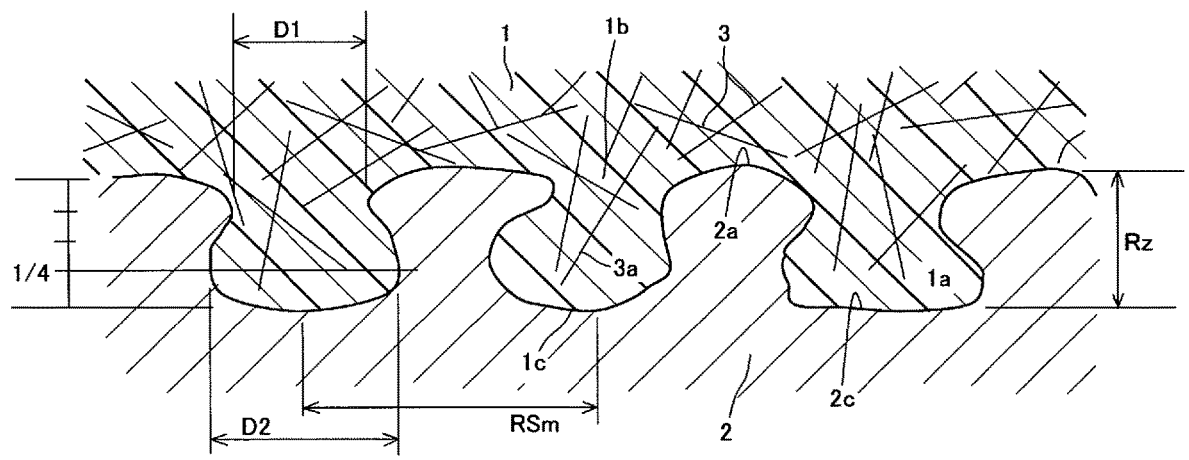
FIG. 2 is an enlarged cross-sectional view of an uneven region A of FIG. 1.

FIG. 2 is an enlarged cross-sectional view of the uneven region A in the metal layer of FIG. 1. At the interface between the resin layer 1 and the metal layer 2, the multilayered body 10 has an uneven region having a recessed part and a protruding part in which a top part 2a and a bottom part 2c are alternately repeated as viewed from the metal layer. The resin layer fills the recessed part of the uneven region.

In particular, an oxide film is formed on the surface of the metal layer over time, and an oxide film is also formed on the surface of the recessed part when the surface of the metal layer is bonded to the resin layer. The formation of the oxide film also reduces the inner volume of the recessed part. That is, the internal volume of the recessed part of the metal layer decreases in a state where a resin composition has filled the recessed part, and the metal layer and the resin layer are more firmly bonded.

A fibrous filler 3 is widely distributed within the resin layer 1 and is also dispersed within a protruding part 1a of the resin layer. For example, as the filler indicated by 3a in the figure, one end of the fibrous filler is positioned so as to be embedded from the outside of the protruding part of the resin layer beyond a root 1b of the protruding part toward a tip 1c of the protruding part. This strengthens the adhesion between the resin layer 1 and the metal layer 2. In other words, the fibrous filler 3 is a continuous fiber, and at least one end of both ends of the fibrous filler is disposed so as to fill (to be embedded) the recessed part in the uneven region of the metal layer, and the anchoring effect increases the adhesion between the resin layer 1 and the metal layer 2.

In particular, in the present invention, the multilayered body can be configured such that, for a width (D2) of a resin filling a recessed part of the uneven region along a line drawn parallel to a metal surface at a point ¼ of a height of the resin from a bottom, D2 is greater than an opening diameter (D1) of the recessed part (D2>D1). That is, the multilayered body can be configured such that the width of the recessed part increases from the top part 2a toward the bottom part 2c in the recessed part. When this is viewed from the side of the resin layer 1, the multilayered body has a structure in which the top part 1c side in the protruding part 1a of the resin bulges relative to the root (opening of the metal layer) 1b of the protruding part 1a of the resin and has an increased volume. In the present embodiment, the multilayered body thus has a structure in which the resin layer 1 and the metal layer 2 are fitted to each other at the interface, and both layers are less easily separated. Furthermore, in this structure, the fibrous filler having filled the recessed part tends to be oriented in the thickness direction (perpendicular to the bonded surface of the resin layer and the metal layer) in the laminate and can effectively exhibit stress on the shear between the resin layer and the metal layer.

A ratio (D2/D1) of the ¼-point width (D2) to the opening diameter (D1) is preferably 1.05 or greater, more preferably 1.1 or greater, and even more preferably 1.2 or greater. The upper limit is preferably 4 or less, and furthermore may be 3 or less, 2 or less, or 1.5 or less. The line drawn parallel to the metal surface corresponds to a line serving as the basis for Rz. The ratio (D2/D1) of the ¼-point width (D2) to the opening diameter (D1) is measured by a method described in Examples below.

Furthermore, the proportion of the ratio (D2/D1) of the ¼ point width (D2) to the opening diameter (D1) of 1.05 or greater in the multilayered body of the present invention is preferably 20% or greater, more preferably 40% or greater, and preferably 45% or greater. With such a configuration, the resin layer and the metal layer fit to each other and are less easily separated. In addition, the upper limit of the proportion of the ratio (D2/D1) of the ¼-point width (D2) to the opening diameter (D1) of 1.1 or greater is ideally 100% but may be 70% or less.

The proportion of the ratio (D2/D1) of the ¼-point width (D2) to the opening diameter (D1) of 1.05 or greater is calculated by a method described in Examples below.

The opening diameter (D1) of the present invention is preferably 0.25 μm or greater, more preferably 0.35 μm or greater, and even more preferably 1.00 μm or greater, and furthermore may be 2 μm or greater or 3 pm or greater. In addition, the upper limit of the opening diameter (D1) is preferably 10 μm or less, more preferably 7 μm or less, even more preferably 5 μm or less, and still more preferably 4.5 μm or less. The opening diameter (D1) is a number average value measured by a method described in Examples below.

The ¼ point width (D2) in the present invention is preferably 0.30 μm or greater, more preferably 0.40 μm or greater, even more preferably 1 μm or greater, and still more preferably 2 μm or greater, and furthermore may be 3 μm or greater or 4 μm or greater. In addition, the upper limit of the ¼ point width (D2) is preferably 12 μm or less, more preferably 8 μm or less, even more preferably 7 μm or less, still more preferably 6.5 pm or less, and still even more preferably 6.0 μm. The ¼ point width (D2) is a number average value measured by a method described in Examples below.

In the uneven region of the multilayered body of the present invention, the curve of the interface formed with the resin layer 1 and the metal layer 2 has an average length (RSm) of the contour curve element from 0.5 to 10 μm, preferably of 0.7 pm or greater, more preferably of 1 μm or greater, even more preferably of 2 μm or greater, and still more preferably of 4 pm or greater. The upper limit is preferably 9 μm or less, and furthermore may be 8 pm or less, 7 μm or less, or 6 μm or less. The average length (RSm) of the contour curve element is an index indicating the size of the opening 1b of the unevenness of the metal layer and means that the larger the RSm, the larger the diameter of the opening tends to be.

In the present invention, the ratio (RSm/F) of the average length (RSm) of the contour curve element of the metal layer to the number average fiber diameter (F) of the fibrous filler is from 1 to 20000. RSm/F is preferably 10 or greater, more preferably 50 or greater, and even more preferably 100 or greater, and furthermore may be 150 or greater or 200 or greater. The upper limit may be 10000 or less or may be 5000 or less, and furthermore may be 1000 or less, 800 or less, 600 or less, or 300 or less.

RSm/F indicates the relationship between the unevenness (in particular, the diameter of the opening) at the interface between the resin layer and the metal layer and the number average fiber diameter of the fibrous filler. A smaller value indicates a relatively larger diameter of the filler relative to the unevenness. Thus, with a too small RSm/F, the fibrous filler would become relatively thick, and its end part would be less likely to be embedded into the recessed part of the metal layer (the protruding part of the resin), and the anchoring effect could not be expected. In addition, with RSm/F of not less than the lower limit, the fibrous filler becomes sufficiently fine. This allows the end part of the fibrous filler to fill together with the resin into the recessed part of the metal layer (the protruding part of the resin) while the fluidity of the resin is maintained. Thus, with RSm/F of not less than the lower limit described above, the anchoring effect can be expected, and the adhesion between the metal layer and the resin layer is increased.

In the present invention, the maximum height roughness (Rz) of the uneven region at the interface between the resin layer and the metal layer is preferably 0.2 μm or greater and more preferably 0.5 μm or greater, and furthermore may be 1 μm or greater, 2 μm or greater, or 3 μm or greater. The upper limit is preferably 5 μm or less and more preferably 4 μm or less. With an Rz within the above range, the fibrous filler easily fills the recessed part more appropriately, and the adhesion tends to be further improved.

Resin Layer

The multilayered body of the present invention has the resin layer. The resin applied to the resin layer of the multilayered body of the present invention is not particularly limited as long as it is a thermoplastic resin but is preferably selected from polyamide resins, polycarbonate resins, polyester resins, polyolefin resins, polypropylene resins, styrene-based resins, polyethylene resins, acrylic resins, polyether ketone resins, polyether ether ketone resins, polyether ketone ketone resins, polyaryl ether ketone resins, and thermoplastic polyimide resins. Among these, the resin is more preferably at least one selected from the group consisting of polyamide resins, polyimide resins, and polycarbonate resins.

Polyamide Resin

The polyamide resin is a polymer having as a constituent unit an acid amide obtained by ring-opening polymerization of a lactam, polycondensation of an aminocarboxylic acid, or polycondensation of a diamine and a dibasic acid, and examples specifically include polyamide 6, 11, 12, 46, 66, 610, 612, 6I, 6/66, 6T/6I, 6/6T, 66/6T, and 66/6T/6I; polyamide MX, poly(trimethylhexamethylene terephthalamide), poly bis(4-aminocyclohexyl)methane dodecamide, poly bis (3-methyl-4-aminocyclohexyl)methane dodecamide, and poly(undecamethylene hexahydroterephthalamide). "I" described above denotes an isophthalic acid component, and "T" a terephthalic acid component. In addition, for the polyamide resin, descriptions in Paragraphs [0011] to [0013] of JP 2011-132550 A can be referred to, the contents of which are incorporated herein by reference.

The polyamide resin used in the present invention is constituted of a diamine-derived constituent unit and a dicarboxylic acid-derived constituent unit, and 50 mol % or greater of the diamine-derived constituent units are preferably a xylylenediamine-based polyamide resin derived from xylylenediamine. Of the diamine-derived constituent units of the xylylenediamine-based polyamide resin, more preferably 70 mol % or greater, even more preferably 80 mol % or greater, still more preferably 90 mol % or greater, and still even more preferably 95 mol % or greater are derived from at least one of m-xylylenediamine or p-xylylenediamine. Of the dicarboxylic acid-derived constituent units of the xylylenediamine-based polyamide resin, preferably 50 mol % or greater, more preferably 70 mol % or greater, even more preferably 80 mol % or greater, still more preferably 90 mol % or greater, and still even more preferably 95 mol % or more are derived from an α,ω-linear aliphatic dicarboxylic acid having from 4 to 20 carbon atoms. For the α,ω-linear aliphatic dicarboxylic acid having from 4 to 20 carbon atoms, adipic acid, sebacic acid, suberic acid, dodecanedioic acid, eicodione acid, or the like can be suitably used, and adipic acid and sebacic acid are more preferred.

Examples of the diamine that can be used as a raw material diamine component of the xylylenediamine-based polyamide resin, other than m-xylylenediamine and p-xylylenediamine, include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines, such as 1,3-bis(aminomethyl)cyclohexane, 1,4-bis(aminomethyl) cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis (aminomethyl)tricyclodecane; and diamines having an aromatic ring, such as bis(4-aminophenyl)ether, p-phenylenediamine, and bis(aminomethyl)naphthalene. One of these can be used, or two or more can be mixed and used.

The dicarboxylic acid component other than the α,ω-linear aliphatic dicarboxylic acid having from 4 to 20 carbon atoms can be exemplified by phthalic acid compounds, such as isophthalic acid, terephthalic acid, and orthophthalic acid; naphthalenedicarboxylic acid isomers, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One of these can be used, or two or more can be mixed and used.

Polycarbonate Resin

The polycarbonate resin is not particularly limited, and any of aromatic polycarbonates, aliphatic polycarbonates, or aromatic-aliphatic polycarbonates can be used. In particular, aromatic polycarbonates are preferred, and thermoplastic aromatic polycarbonate polymers or copolymers obtained by reacting an aromatic dihydroxy compound with a phosgene or a diester of carbonic acid are more preferred.

Examples of the aromatic dihydroxy compound include 2,2-bis(4-hydroxyphenyl)propane (=bisphenol A), tetramethyl bisphenol A, bis(4-hydroxyphenyl)-p-diisopropylbenzene, hydroquinone, resorcinol, and 4,4-dihydroxydiphenyl, and preferably bisphenol A. Furthermore, for the purpose of preparing a resin composition with high flame retardancy, a compound in which one or more tetraalkylphosphonium sulfonates are attached to the aromatic dihydroxy compound described above, or a polymer or oligomer having a siloxane structure and containing phenolic OH groups at both ends, or the like can be used.

Preferred examples of the polycarbonate resin used in the present invention include polycarbonate resins derived from 2,2-bis(4-hydroxyphenyl)propane, and polycarbonate copolymers derived from 2,2-bis(4-hydroxyphenyl)propane and another aromatic dihydroxy compound.

The method for manufacturing the polycarbonate resin is not particularly limited, and a polycarbonate resin manufactured by any method, such as a phosgene method (interfacial polymerization method) and a melting method (transesterification method), can be used in the present invention. In addition, a polycarbonate resin manufactured through a manufacturing process of a typical melting method followed by a step of adjusting OH group amount in the end group may be used in the present invention.

Furthermore, the polycarbonate resin used in the present invention may be not only a polycarbonate resin as a virgin raw material but also a polycarbonate resin regenerated from a used product, or what is called a material-recycled polycarbonate resin.

In addition, for the polycarbonate resin used in the present invention, for example, descriptions in paragraphs [0018] to [0066] of JP 2012-072338 A and descriptions in paragraphs [0011] to [0018] of JP 2015-166460 A can be referred to, the contents of which are incorporated herein by reference.

Thermoplastic Polyimide Resin

The thermoplastic polyimide resin is not particularly limited, and a known thermoplastic polyimide resin can be used. The thermoplastic polyimide resin is exemplified by a thermoplastic polyimide resin formed from a tetracarboxylic acid component and a diamine component. The tetracarboxylic acid component contains a tetracarboxylic acid containing at least one aromatic ring and/or a derivative of the tetracarboxylic acid, and the diamine component contains a diamine containing at least one alicyclic hydrocarbon structure and a chain aliphatic diamine.

The tetracarboxylic acid containing at least one aromatic ring is preferably a compound in which four carboxy groups are directly attached to an aromatic ring, and may contain an alkyl group in the structure. In addition, the tetracarboxylic acid preferably has from 6 to 26 carbon atoms. The tetracarboxylic acid is preferably pyromellitic acid, 2,3,5,6-toluenetetracarboxylic acid, 3,3',4,4'-benzophenonetetracarboxylic acid, 3,3',4,4'-biphenyltetracarboxylic acid, and 1,4,5,8-naphthalenetetracarboxylic acid. Among these, pyromellitic acid is more preferred.

Examples of the derivative of the tetracarboxylic acid containing at least one aromatic ring include anhydrides or alkyl esters of a tetracarboxylic acid containing at least one aromatic ring. The tetracarboxylic acid derivative preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. Examples of the alkyl ester of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. The alkyl ester of the tetracarboxylic acid has preferably from 1 to 3 carbon atoms.

For the tetracarboxylic acid containing at least one aromatic ring and/or the derivative of the tetracarboxylic acid, at least one compound selected from the above may be used alone, or two or more compounds in combination.

The diamine containing at least one alicyclic hydrocarbon structure has preferably from 6 to 22 carbon atoms and is preferably, for example, 1,2-bis(aminomethyl)cyclohexane, 1,3-bis(aminomethyl)cyclohexane, 1,4-bis(aminomethyl) cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvonediamine, limonenediamine, isophoronediamine, norbornanediamine, bis(aminomethyl)tricyclo[5.2.1.02,6]decane, 3,3'-dimethyl-4,4'-diaminodicyclohexylmethane, or 4,4'-diaminodicyclohexylpropane. One of these compounds may be used alone, or two or more compounds selected from these may be used in combination. Of these, 1,3-bis(aminomethyl)cyclohexane can be suitably used. The diamine containing an alicyclic hydrocarbon structure typically has structural isomers, but the ratio of the cis isomer to the trans isomer is not limited.

The chain aliphatic diamine may be linear or branched and has preferably from 5 to 16, more preferably from 6 to 14, and even more preferably from 7 to 12 carbon atoms. In addition, the chain part having from 5 to 16 carbon atoms may contain an ether bond between these carbon atoms. The chain aliphatic diamine is preferably, for example, 1,5- pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

One of the chain aliphatic diamines may be used, or a plurality of them may be mixed and used. Of these, a chain aliphatic diamine having from 8 to 10 carbon atoms can be suitably used, and in particular, at least one selected from the group consisting of 1,8-octamethylenediamine and 1,10-decamethylenediamine can be suitably used.

In manufacturing the polyimide resin, the molar ratio of the amount of the diamine containing at least one alicyclic hydrocarbon structure to be charged to the total amount of the diamine containing at least one alicyclic hydrocarbon structure and the chain aliphatic diamine is preferably from 20 to 70 mol %. The molar amount is preferably 25 mol % or higher, more preferably 30 mol % or higher, and even more preferably 32 mol % or higher, and from the viewpoint of exhibiting high crystallinity, preferably 60 mol % or lower, more preferably 50 mol % or lower, even more preferably 40 mol % or lower, and still more preferably 35 mol % or lower.

In addition, the diamine component may contain a diamine containing at least one aromatic ring. The diamine containing at least one aromatic ring has preferably from 6 to 22 carbon atoms, and examples include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis[4-(4-aminophenoxy)phenyl]propane, 2,6-diaminonaphthalene, and 1,5-diaminonaphthalene.

In the above, the molar ratio of the amount of the diamine containing at least one aromatic ring to be charged to the total amount of the diamine containing at least one alicyclic hydrocarbon structure and the chain aliphatic diamine is preferably 25 mol % or lower. On the other hand, the lower limit is not particularly limited and is any molar ratio higher than 0 mol %.

From the viewpoint of improving thermal resistance, the molar ratio is preferably 5 mol % or higher and more preferably 10 mol % or higher, while from the viewpoint of maintaining crystallinity, the molar ratio is preferably 20 mol % or lower and more preferably 15 mol % or lower.

In addition, from the viewpoint of reducing coloration of the polyimide resin, the molar ratio is preferably 12 mol % or lower, more preferably 10 mol % or lower, even more preferably 5 mol % or lower, and still more preferably 0 mol %.

In manufacturing the polyimide resin, the ratio of the amount of the tetracarboxylic acid component to be charged to the amount of the diamine component to be charged is preferably such that the amount of the diamine component is from 0.9 to 1.1 mol relative to 1 mol of the tetracarboxylic acid component.

In addition, in manufacturing the polyimide resin, an end-capping agent may be mixed in addition to the tetracarboxylic acid component and the diamine component. The end-capping agent is preferably at least one selected from the group consisting of monoamines and dicarboxylic acids. The amount of the end-capping agent to be used is any amount at which a desired amount of an end group can be introduced into the polyimide resin and is preferably from 0.0001 to 0.1 mol, more preferably from 0.001 to 0.06 mol, and even more preferably from 0.002 to 0.035 mol relative to 1 mol of the tetracarboxylic acid and/or its derivative.

Examples of the monoamine end-capping agent include methylamine, ethylamine, propylamine, butylamine, n-pentylamine, n-hexylamine, n-heptylamine, n-octylamine, n-nonylamine, n-decylamine, n-undecylamine, laurylamine, n-tridecylamine, n-tetradecylamine, isopentylamine, neopentylamine, 2-methylpentylamine, 2-methylhexylamine, 2-ethylpentylamine, 3-ethylpentylamine, isooctylamine, 2-ethylhexylamine, 3-ethylhexylamine, isononylamine, 2-ethyloctylamine, isodecylamine, isododecylamine, isotridecylamine, isotetradecylamine, benzylamine, 4-methylbenzylamine, 4-ethylbenzylamine, 4-dodecylbenzylamine, 3-methylbenzylamine, 3-ethylbenzylamine, aniline, 3-methylaniline, and 4-methylaniline.

The dicarboxylic acid end-capping agent is preferably a dicarboxylic acid, and a portion of the dicarboxylic acid may be cyclized. Examples include phthalic acid, phthalic anhydride, 4-chlorophthalic acid, tetrafluorophthalic acid, 2,3-benzophenone dicarboxylic acid, 3,4-benzophenone dicarboxylic acid, cyclohexane-1,2-dicarboxylic acid, cyclopentane-1,2-dicarboxylic acid, and 4-cyclohexene-1,2-dicarboxylic acid. Of these, phthalic acid and phthalic anhydride are preferred.

Only one, or two or more of these end-capping agents may be used.

In particular, a monoamine end-capping agent is preferred, and from the viewpoint of introducing a chain aliphatic group having from 5 to 14 carbon atoms to the end of the polyimide resin to improve heat aging resistance, a monoamine having a chain aliphatic group having from 5 to 14 carbon atoms is more preferred, and a monoamine having a saturated linear aliphatic group having from 5 to 14 carbon atoms is even more preferred. The chain aliphatic group has preferably 6 or more carbon atoms, more preferably 7 or more carbon atoms, and even more preferably 8 or more carbon atoms, and preferably 12 or less carbon atoms, more preferably 10 or less carbon atoms, and even more preferably 9 or less carbon atoms. With the chain aliphatic group having 5 or more carbon atoms, the chain aliphatic group contained in the monoamine, the monoamine is less likely to volatilize during the manufacture of the polyamide resin; thus, this is preferred.

The end-capping agent is particularly preferably at least one selected from the group consisting of n-octylamine, isooctylamine, 2-ethylhexylamine, n-nonylamine, isononylamine, n-decylamine, and isodecylamine; even more preferably at least one selected from the group consisting of n-octylamine, isooctylamine, 2-ethylhexylamine, n-nonylamine, and isononylamine; and most preferably at least one selected from the group consisting of n-octylamine, isooctylamine, and 2-ethylhexylamine.

The resin layer of the multilayered body according to the present invention contains the thermoplastic resin in a total of preferably 40 mass % or higher, more preferably 50 mass % or higher, and even more preferably 60 mass % or higher. In addition, the resin layer of the multilayered body according to the present invention contains the thermoplastic resin in a total of preferably 95 mass % or lower, more preferably 90 mass % or lower, even more preferably 80 mass % or lower, and still more preferably 70 mass % or lower.

One, or two or more of the thermoplastic resins may be used. When two or more thermoplastic resins are used, the total amount is within the above range.

The thickness of the resin layer in the multilayered body of the present invention is preferably 15 pm or greater, more preferably 50 μm or greater, and even more preferably 100 pm or greater. The upper limit can be appropriately determined according to the application or the like. For example, for a plate-like resin layer, the upper limit is preferably 10000 μm or less, more preferably 7500 μm or less, and even more preferably 5000 μm or less. The "thickness" here refers to the thickness including the bottom part (1c).

Fibrous Filler

The fibrous filler contained in the resin layer in the multilayered body of the present invention is not particularly limited and may be a short fiber, a long fiber, or a continuous fiber, but is preferably a short fiber or a long fiber.

The fibrous filler is those having a cross section in a shape of a circle, ellipse, polygon, or the like and satisfying L/W>1 when the length in the fiber axial direction is the fiber length L, and the length of the largest part of the cross section is the fiber diameter W, and L/W is preferably 2 or greater, more preferably from 10 to 10000, and even more preferably from 50 to 5000. The fiber diameter does not have to be uniform across the fiber axial direction. That is, the fiber cross section may not be the same size across the fiber axial direction. For example, the fibrous filler may be those with a tapered end part or those with an end part thicker than a halfway part in the fiber axial direction.

The number average fiber diameter (F) of the fibrous filler in the multilayered body is less than 1 μm, preferably 800 nm or less and more preferably 600 nm or less, and may be 400 nm or less, or furthermore may be 100 nm or less, 50 nm or less, or 30 nm or less. In addition, the lower limit is preferably 0.01 nm or greater, more preferably 0.08 nm or greater, even more preferably 0.1 nm or greater, still more preferably 1 nm or greater, still even more preferably 10 nm or greater, and even still more preferably 15 nm or greater.

The number average fiber length of the fibrous filler in the multilayered body is preferably 1 mm or shorter, more preferably 700 μm or shorter, and even more preferably 500 μM or shorter. In addition, the lower limit is preferably 1 nm or longer, more preferably 10 nm or longer, and even more preferably 50 nm or longer.

The number average fiber diameter is the number average of the fiber diameters at the largest part of the cross-section measured for 100 fibrous fillers.

The number average fiber length is the number average of the lengths measured for 100 fibrous fillers.

The number average fiber diameter and the number average fiber length of the fibrous filler used as a raw material can be measured as directed above by observing with a scanning electron microscope.

The number average fiber diameter and the number average fiber length of the fibrous filler in the multilayered body are measured according to a method described in Examples below.

Examples of the fibrous filler include inorganic fibrous fillers, organic fibrous fillers, and combinations of an inorganic fibrous filler and an organic fibrous filler.

Examples of the inorganic fibrous fillers include glass fibers, quartz fibers, alumina fibers, silicon carbide fibers, carbon nanofibers, carbon nanotubes, whisker fibers, and metal fibers. The organic fibrous fillers are exemplified by cellulose nanofibers and chitosan nanofibers.

Particularly in the present invention, preferred examples include carbon nanofibers (e.g., a number average fiber diameter from preferably 0.5 to 250 nm and a number average fiber length from preferably 100 to 5000 nm for those contained in the multilayered body), single-walled carbon nanotubes (e.g., a number average fiber diameter from preferably 0.5 to 15 nm and a number average fiber length from preferably 5 to 20 μm for those contained in the multilayered body), multi-walled carbon nanotubes (e.g., a number average fiber diameter of preferably 0.5 to 20 nm and a number average fiber length of preferably 5 to 20 nm for those contained in the multilayered body), cellulose nanofibers (e.g., a number average fiber diameter from preferably 10 to 300 nm and a number average fiber length from preferably 100 to 10000 nm for those contained in the multilayered body), and carbon nanohorns (e.g., a number average fiber diameter from preferably 2 to 5 nm and a number average fiber length from preferably 40 to 50 nm for those contained in the multilayered body), and carbon nanofibers and cellulose nanofibers are preferred.

A raw material fibrous filler used in the present invention is preferably a nanofiber.

The "nanofiber" in the present invention refers to a fiber with a number average fiber diameter from 1 to 1000 nm (preferably from 1 to 100 nm and more preferably from 1 to 50 nm) and a number average fiber length of 10 times or greater (preferably 100 times or greater and more preferably 100 to 1000 times) the number average fiber diameter.

The content of the fibrous filler in the resin is not particularly limited but is preferably 5 mass % or higher and more preferably 8 mass % or higher, and may be 10 mass % or higher, 20 mass % or higher, or 30 mass % or higher relative to the resin composition containing the thermoplastic resin and the fibrous filler. The upper limit is preferably 60 mass % or lower, more preferably 50 mass % or lower, and even more preferably 40 mass % or lower. One kind of the fibrous filler, or two or more kinds of the fibrous fillers may be used. When two or more kinds of the fibrous fillers are used, the total amount is within the above range.

Additional Component

The resin layer of the present invention is typically formed from a resin composition containing a thermoplastic resin and a fibrous filler. Such a resin composition may or may not contain a component other than the thermoplastic resin and the fibrous filler.

The additional component is exemplified by fillers other than the fibrous filler with a number average fiber diameter of less than 1 μm, nucleating agents, mold release agents, flame retardants, light stabilizers, antioxidants, hydrolysis resistance improving agents, matting agents, ultraviolet absorbers, plasticizers, dispersants, antistatic agents, coloration inhibitors, anti-gelling agents, and colorants. For these details, descriptions in paragraphs [0130] to [0155] of JP 4894982 B can be referred to, the contents of which are incorporated herein by reference. The content of these components is preferably 20 mass % or lower in total of the polyamide resin composition. Only one of these components may be used, or two or more of these may be used in combination.

The resin composition can be configured to be substantially free of a fibrous filler with a number average fiber diameter of 1 μm or greater. "Substantially free of" means that the amount of a fibrous filler with a number average fiber diameter of 1 μm or greater is lower than 1 mass %, preferably 0.5 mass % or lower, and more preferably 0.1 mass % or lower of the resin composition.

The resin composition can be also configured to be substantially free of a filler other than the fibrous filler. "Substantially free of" means that the amount of a filler other than the fibrous filler is lower than 1 mass %, preferably 0.5 mass % or lower, and more preferably 0.1 mass % or lower of the resin composition.

The resin composition is typically substantially free of a solvent. "Substantially free" means that the amount of a solvent is 1 mass % or lower, preferably 0.5 mass % or lower, and more preferably 0.1 mass % or lower of the resin composition.

The resin composition can be adjusted by mixing the thermoplastic resin and the fibrous filler using a mixing means, such as a V-type blender, to prepare a batch blended product, followed by melt-kneading and pelletizing the blended product with a vented extruder. In addition, in this case, the fibrous filler may be side-fed.

Furthermore, the resin composition molded directly into a film or the like may be used without pelletizing the resin composition.

An embodiment of the resin layer of the present invention is exemplified by an aspect in which a total of the thermoplastic resin that is at least one selected from the group consisting of polyamide resins, polyimide resins, and polycarbonate resins, and the fibrous filler with a number average fiber diameter (F) of less than 1 pm accounts for 90 mass % or higher of the resin composition, and the total is preferably 95 mass % or higher.

Another embodiment of the resin layer of the present invention includes an aspect in which the thermoplastic resin is at least one selected from polyether ketone resins, polyether ether ketone resins, polyether ketone ketone resins, polyaryl ether ketone resins, and thermoplastic polyimide resins, and the fibrous filler is a carbon nanotube. The embodiment preferably includes an aspect in which the thermoplastic resin is a thermoplastic polyimide resin, and the fibrous filler is a carbon nanotube. In the present invention, selecting the thermoplastic resin from the above and using a carbon nanotube as the fibrous filler can further improve the thermal resistance and deflection temperature under load of the resulting resin layer. Examples of the improvement in thermal resistance include an improvement in glass transition temperature.

Metal Layer

The multilayered body of the present invention has the metal layer. The metal layer is a layer containing a metal as the main component. Here, "containing a metal as the main component" means that 70 mass % or higher of the metal layer is a metal, typically 90 mass % or higher of the metal layer is a metal, and preferably 98 mass % or higher is a metal. The metal layer may contain one, or two or more metals. When two or more metals are contained, the total amount is the amount of the metal contained in the metal layer.

The metal layer in the present invention preferably contains at least one selected from iron, aluminum, stainless steel, and magnesium alloy, more preferably contains iron and/or aluminum, and even more preferably contains iron.

Here, the stainless steel is an alloy containing iron as a main component and chromium and/or nickel. In addition, an element to be added to the magnesium alloy is exemplified by aluminum and/or zinc.

The thickness of the metal layer in the present invention is preferably 0.1 mm or greater and more preferably 0.5 mm or greater. The upper limit can be appropriately determined according to the application or the like. For example, for a plate-like metal layer, the upper limit is preferably 10 mm or less and more preferably 5 mm or less.

The surface of the metal layer is provided with the uneven part. The method for providing the unevenness is not particularly specified but is exemplified by cutting, grinding, laser treatment, and chemical treatment. For these details, descriptions in paragraphs [0018] to [0021] of JP 2003-103563 A and paragraphs [0021] to [0026] of JP 2003-103563 A can be referred to, the contents of which are incorporated herein by reference.

The method for forming the multilayered body of the metal layer and the resin layer is not particularly limited, but the multilayered body is preferably manufactured by applying the resin composition in a molten state to the recessed part of the metal layer, followed by cooling. Specifically, the method is exemplified by a method of injection molding the resin composition (e.g., pellets) onto a surface of a surface-treated metal layer, and a method of applying a film formed from the resin composition to a surface of a surface-treated metal layer and heat-pressing.

An example includes a method for manufacturing a multilayered body, the method including applying a resin composition containing a thermoplastic resin and a fibrous filler to a metal layer having an uneven region with an average length (RSm) of a contour curve element from 0.5 to 10 μm, so that the resin composition is brought into contact with the uneven region of the metal layer, the fibrous filler having a number average fiber diameter (Fm) of less than 1 μm, and the fibrous filler having a ratio (RSm/Fm) of the average length (RSm) of the contour curve element of the uneven region to the number average fiber diameter (Fm) of from 1 to 20000. Fm is a number average fiber diameter of the fibrous filler as a raw material. Preferably, the resin composition is melt-kneaded and then applied to the metal layer by a method, such as injection molding.

In addition, when a carbon nanofiber, a single-walled carbon nanotube, a multi-walled carbon nanotube, a cellulose nanofiber, or a carbon nanohorn is used as the fibrous filler, the number average fiber diameter (F) of the fibrous filler in the multilayered body is approximately the same as the number average fiber diameter (Fm) of the fibrous filler as the raw material even when the multilayered body is molded via common melt-kneading and injection molding. Thus, the preferred range of the number average fiber diameter (Fm) of the fibrous filler as the raw material is the same as the preferred range of the number average fiber diameter (F) of the fibrous filler in the multilayered body described above.

Additionally, for manufacturing the multilayered body, descriptions in paragraphs [0061] to [0063] of JP 2018-177867 A can be referred to, the contents of which are incorporated in the present specification.

The multilayered body of the present invention may have any shape, such as a plate shape (such as a circular plate or polygonal plate), a column shape, a box shape, a bowl shape, or a tray shape. In addition, the multilayered body may be provided with a reinforcing rib or the like.

The multilayered body of the present invention has a strong bond between the metal layer and the resin layer and has excellent mechanical strength, and thus can be suitably used as a material for common household appliances; electric and electronic components (such as housings, cases, and covers) of office automation equipment (such as copying machines, printers, and facsimiles), various portable terminals (such as mobile phones), personal computers, and the like; components for vehicles, such as automobiles (such as structural components for vehicles or, e.g., brake pedals); mechanical components; and components for bicycles and others.

EXAMPLES

The present invention will be described more in detail based on examples below, but the present invention is not construed as being limited to these examples.
Raw Materials
Thermoplastic Resins Polyamide resin: MX Nylon 6000 (MXD6): poly(m-xylylene adipamide), available from Mitsubishi Gas Chemical Company, Inc.

Polyimide resin: A thermoplastic polyimide resin was synthesized according to a description in Example 1 in paragraph [0128] of WO 2016/147996.

Polycarbonate resin: S-3000FN, available from Mitsubishi Engineering-Plastics Corporation
Fillers Carbon nanotube (CNT): a carbon nanotube, multi-walled, available from FUJIFILM Wako Chemical Corporation, a number average fiber diameter of 20 nm, a number average fiber length of 5 μm Cellulose nanofiber: Celish (KY100G), available from Daicel Corporation, a number average fiber diameter of 280 nm, a number average fiber length of 450 μm Carbon nanofiber: carbon nanochips, available from Sigma-Aldrich, a number average fiber diameter of 160 nm, a number average fiber length of 2000 nm Ceramic fiber: ISOWOOL bulk, available from Isolite Insulating Products Co., Ltd., an average fiber diameter of 2000 nm, a number average fiber length (cotton-like)

Carbon fiber: TRH50 18M, available from Mitsubishi Chemical Corporation, an average fiber diameter of 6000 nm, used by cutting into 3-mm length.

Examples 1 to 8 and Comparative Examples 1 to 3

Thermoplastic resins described in Table 1 or Table 2 and fillers described in Table 1 or Table 2 were melt-extruded in amounts described in Table 1 or Table 2 in a twin-screw extruder with screws of 30 mm φ, and pellets (resin compositions) were obtained. The extrusion temperature during melt extrusion was set at 280° C. for the polyamide resin, 350° C. for the thermoplastic polyimide resin, and 290° C. for the polycarbonate resin.

The processing of the uneven part of the metal layer was performed as follows.

An aluminum alloy thin plate (A5052) was cut to 60×60×2 (mm). The temperature of an aqueous solution containing 7.5 vol. % of a degreaser for aluminum "NE-6 (available from Meltex Inc.)" in a liquid bath was adjusted to 60° C., and an aluminum alloy thin plate was immersed in the solution for 5 minutes and washed with distilled water. A hydrochloric acid aqueous solution with a concentration of 1 mass % at 40° C. was then prepared in another bath, and the degreased aluminum alloy thin plate was immersed in this hydrochloric acid aqueous solution for 1 minute and washed with water. A 1.5 mass % sodium hydroxide aqueous solution at 40° C. was then prepared in another bath, and the aluminum alloy thin plate was immersed in this solution for 4 minutes and washed with water. The aluminum alloy thin plate was then immersed in a nitric acid aqueous solution with a concentration of 3 mass % at 40° C. in another bath for 3 minutes and washed with water. A hydrazine hydrate aqueous solution with a concentration of 3.5 mass % at 60° C. was then prepared in another bath, and the aluminum alloy thin plate was immersed in this solution for 1 minute and then in a hydrazine hydrate aqueous solution with a concentration of 0.5 mass % at 33° C. prepared in another bath for 6 minutes and washed with water. The resulting test piece was stored in an aluminum bag.

In Examples 2 to 8 and Comparative Examples 2 and 3, the immersion times and concentrations were adjusted, and test pieces with a surface roughness described in Table 1 or Table 2 were obtained.

In addition, the processing of the uneven part of the metal layer of Comparative Example 1 was performed as follows.

A mirror surface was obtained by buff polishing on one flat surface. The polished surface was scrubbed and then subjected to a non-corrosive degreasing treatment. Furthermore, anodic oxidation conditions were set to an electrolytic solution of a 0.05 M oxalic acid aqueous solution, a direct current voltage of 80 V, and a temperature of the electrolyte solution of 5.0° C., and a time of 30 seconds; and etching process conditions of the anodic oxide film were set to an etchant of a 2 mass % phosphoric acid aqueous solution, a temperature of the etchant of 50.0° C., and a time of 2 minutes. The anodic oxidation process and the etching process were repeated alternately 10 times each, and finally completed with the anodic oxidation process.

The processed metal layer was inserted into a mold of an injection molding machine, the mold for molding a 60 (mm)×60 (mm)×4 (mm) plate, and the pellets obtained above and described in Table 1 or Table 2 were injected. The injection temperature during the molding was set at 280° C. for the polyamide resin, 350° C. for the polyimide resin, and 290° C. for the polycarbonate resin.

To compare the strength, an unprocessed aluminum alloy thin plate (A5052) was used, and pellets obtained above were injected and insert-molded in the same manner.

The vicinity of the uneven region of the surface-treated multilayered body (the part corresponding to the interface between the metal layer and the resin layer) was cut in a cross section perpendicular to the interface between the metal layer and the resin layer, and observed with a scanning electron microscope to measure RSm of the metal layer, Rz of the metal layer, the opening diameter (D1) of the recessed part of the metal layer, and the ¼ point width (D2) of the resin. As described above, the ¼-point width (D2) is the width of the resin on a line drawn parallel to the metal surface at a point ¼ from the bottom part of the resin height having filled the recessed part.

At this time, values of 20 points in 3 samples (a total of 60 points) were measured for each item. Of these, the three largest values and the three smallest values were excluded from the evaluation. The number average value of the remaining 54 points was used for the evaluation. The ¼-point width/opening diameter (D2/D1) was calculated for each recessed part, and the number average value was determined. Other details were in accordance with JIS (Japanese Industrial Standards) B0601:2013.

The proportion of the ¼-point width (D2)/the opening diameter (D1) (D2/D1) of 1.05 or greater was calculated based on the measurement results of the 54 points.

The number average fiber diameter (F) of the filler in the multilayered body was obtained by dissolving the milled multilayered body in hexafluoroisopropanol, filtering off the reinforcing fiber, observing randomly selected 20 fibrous fillers with a scanning electron microscope image, and measuring the number average value. If the fibrous filler is difficult to separate with hexafluoroisopropanol, sulfuric acid is used as a solvent. Furthermore, if the fibrous filler is difficult to separate using sulfuric acid, aqua regia is used as a solvent.

Adhesion

From the scanning electron microscope image, the degree of penetration of the resin into the metal layer recessed part was observed, and the adhesion was evaluated from the following viewpoints. Penetration into the deeper part means higher adhesion.

A: The resin filled the bottom part of the recessed part of the metal layer.

B: The resin did not fill all of the recessed parts of the metal layer but filled ¼ or more from the bottom part.

C: The resin did not fill ¼ from the bottom part of the metal layer.

Moldability

The moldability of the laminate was evaluated according to the following items. Five experts evaluated and decided by a majority vote.

A: A uniform laminate without warping was obtained.

B: Warpage occurred.

Strength

The above laminate was cut to a width of 10 mm and subjected to a bending test in accordance with JIS K7171 with the metal layer on the underside and compared to those without processing the uneven part of the metal.

A: The strength improved by 20% or more

B: The strength improved by 10% or more and less than 20%

C: The strength improved by 5% or more and less than 10%

D: The strength improved by less than 5%, or the strength was equivalent or decreased

TABLE 1

|  |  | Example 1 | Example 2 | Example 3 | Example 4 | Example 5 |
|---|---|---|---|---|---|---|
| Thermoplastic resin |  | Polyamide resin | Polyamide resin | Polyamide resin | Polyamide resin | Polyimide resin |
| Type of filler |  | CNT | CNT | CNT | CNT | CNT |
| Amount of filler (parts by mass relative to 100 parts by mass of thermoplastic resin) |  | 11 | 11 | 11 | 11 | 11 |
| Average length (RSm) of contour curve element | μm | 5 | 9 | 5 | 5 | 5 |
| Maximum height roughness (Rz) | μm | 3.5 | 3.5 | 0.5 | 3.5 | 3.5 |
| Number average fiber diameter of filler in multilayered body (F) | nm | 20 | 18 | 19 | 18 | 18 |
| Number average fiber diameter of filler in multilayered body (F) | μm | 0.02 | 0.018 | 0.019 | 0.018 | 0.018 |
| RSm/F | — | 250 | 500 | 260 | 280 | 280 |
| Opening diameter (D1) | μm | 4.1 | 8.3 | 4.2 | 4.3 | 4.0 |
| ¼-point width (D2) | μm | 4.9 | 10.8 | 4.6 | 6.0 | 4.8 |
| ¼-point width/opening diameter | — | 1.2 | 1.3 | 1.1 | 1.4 | 1.2 |
| Proportion of ¼-point width/opening diameter of 1.05 or greater | % | 60 | 50 | 60 | 30 | 60 |
| Adhesion |  | A | A | A | A | A |
| Moldability |  | A | A | A | A | A |
| Strength |  | B | B | B | C | B |

TABLE 2

|  |  | Example 6 | Example 7 | Example 8 | Comparative Example 1 | Comparative Example 2 | Comparative Example 3 |
|---|---|---|---|---|---|---|---|
| Thermoplastic resin |  | Polycarbonate resin | Polyamide resin | Polyamide resin | Polyamide resin | Polyamide resin | Polyamide resin |
| Type of filler |  | CNT | Cellulose nanofiber | Carbon nanofiber | Cellulose nanofiber | Ceramic fiber | Carbon fiber |
| Amount of filler (parts by mass relative to 100 parts by mass of thermoplastic resin) |  | 11 | 24 | 42 | 24 | 24 | 30 |
| Average length (RSm) of contour curve element | μm | 5 | 5 | 5 | 0.2 | 1.5 | 5 |
| Maximum height roughness (Rz) | μm | 3.5 | 3.5 | 3.5 | 0.3 | 0.5 | 3.5 |
| Number average fiber diameter of filler in multilayered body (F) | nm | 19 | 280 | 160 | 280 | 2000 | 6000 |
| Number average fiber diameter of filler in multilayered body (F) | μm | 0.019 | 0.28 | 0.16 | 0.28 | 2 | 6 |
| RSm/F | — | 260 | 17.9 | 31 | 0.71 | 0.75 | 0.83 |
| Opening diameter (D1) | μm | 4.2 | 4.0 | 4.1 | 0.18 | 1.2 | 4.1 |
| ¼-point width (D2) | μm | 5.0 | 4.8 | 5.3 | 0.22 | 1.6 | 4.9 |

TABLE 2-continued

|  | | Example 6 | Example 7 | Example 8 | Comparative Example 1 | Comparative Example 2 | Comparative Example 3 |
|---|---|---|---|---|---|---|---|
| ¼-point width/opening diameter | | — | 1.2 | 1.2 | 1.3 | 1.2 | 1.3 | 1.2 |
| Proportion of ¼-point width/opening diameter of 1.05 or greater | % | 60 | 60 | 60 | 60 | 60 | 60 |
| Adhesion | | A | A | A | C | C | C |
| Moldability | | A | A | A | A | A | A |
| Strength | | B | B | A | D | D | D |

As can be seen from the results described above, the multilayered body of the present invention had excellent adhesion between the metal layer and the resin layer, moldability, and strength (Examples 1 to 8).

In contrast, multilayered bodies in Comparative Examples 1 to 3, having small RSm and RSm/F below the lower limit, had poor adhesion between the resin layer and the metal layer, and poor strength.

REFERENCE SIGNS LIST

1 Resin layer
1a Protruding part of resin (recessed part of metal layer)
1b Root of resin protruding part (opening of metal layer)
1c Tip of resin protruding part
2 Metal layer
2a Top part of metal layer
2c Bottom part of metal layer
3 Fibrous filler
10 Multilayered body
D1 Opening diameter of opening
D2 Width of ¼ point of resin protruding part (¼ point width)
Rz Maximum height roughness
RSm Average length of contour curve element

The invention claimed is:

1. A multilayered body comprising a metal layer having an uneven region with an average length (RSm) of a contour curve element from more than 1 μm to 9 μm or less, and a resin layer in contact with the uneven region of the metal layer,
the resin layer containing a thermoplastic resin and a fibrous filler,
the fibrous filler having a number average fiber diameter (F) of less than 1 μm, and
the fibrous filler having a ratio (RSm/F) of the average length (RSm) of the contour curve element of the uneven region to the number average fiber diameter (F) from 1 to 20000;
wherein a content of the fibrous filler in the resin layer is from 8 to 50 mass % and an amount of the fibrous filler with a number average fiber diameter of 1 μm or more is less than 1 mass % of the resin layer,
for a width (D2) of a resin filling a recessed part of the uneven region along a line drawn parallel to a metal surface at a point ¼ of a height of the resin from a bottom, D2 is greater than an opening diameter (D1) of the recessed part (D2>D1), and
a proportion of a ratio (D2/D1) of the ¼ point width (D2) to the opening diameter (D1) of 1.05 or greater in the multilayered body of the present invention is 40% or greater.

2. The multilayered body according to claim 1, wherein the uneven region in the metal layer has a maximum height roughness (Rz) from 0.2 to 5 μm.

3. The multilayered body according to claim 1, wherein the fibrous filler comprises at least one selected from the group consisting of carbon nanofibers, single-walled carbon nanotubes, multi-walled carbon nanotubes, cellulose nanofibers and carbon nanohorns.

4. The multilayered body according to claim 1, wherein the resin constituting the resin layer is at least one selected from the group consisting of polyamide resins, polyimide resins, and polycarbonate resins.

5. The multilayered body according to claim 1, wherein the ratio (RSm/F) is from 10 to 5000.

6. A method for manufacturing a multilayered body, the method comprising applying a resin composition containing a thermoplastic resin and a fibrous filler to a metal layer having an uneven region with an average length (RSm) of a contour curve element from more than 1 μm to 9 μm or less, so that the resin composition is brought into contact with the uneven region of the metal layer,
the fibrous filler having a number average fiber diameter (Fm) of less than 1 μm, and
the fibrous filler having a ratio (RSm/Fm) of the average length (RSm) of a contour curve element of the uneven region to the number average fiber diameter (Fm) from 1 to 20000,
wherein a content of the fibrous filler in the resin composition is from 8 to 50 mass % and an amount of the fibrous filler with a number average fiber diameter of 1 μm or more is less than 1 mass % of the resin layer,
for a width (D2) of a resin filling a recessed part of the uneven region along a line drawn parallel to a metal surface at a point ¼ of a height of the resin from a bottom, D2 is greater than an opening diameter (D1) of the recessed part (D2>D1), and
a proportion of a ratio (D2/D1) of the ¼ point width (D2) to the opening diameter (D1) of 1.05 or greater in the multilayered body of the present invention is 40% or greater.

7. The multilayered body according to claim 2, wherein the fibrous filler comprises at least one selected from the group consisting of carbon nanofibers, single-walled carbon nanotubes, multi-walled carbon nanotubes, cellulose nanofibers and carbon nanohorns.

8. The multilayered body according to claim 2, wherein the resin constituting the resin layer is at least one selected from the group consisting of polyamide resins, polyimide resins, and polycarbonate resins.

9. The multilayered body according to claim 2, wherein the ratio (RSm/F) is from 10 to 5000.

10. The multilayered body according to claim 3, wherein the resin constituting the resin layer is at least one selected from the group consisting of polyamide resins, polyimide resins, and polycarbonate resins.

11. The multilayered body according to claim 3, wherein the ratio (RSm/F) is from 10 to 5000.

12. The multilayered body according to claim 4, wherein the ratio (RSm/F) is from 10 to 5000.

13. The multilayered body according to claim 1, wherein the metal layer has an uneven region with an average length (RSm) of a contour curve element from 2 μm or greater and 9 μm or less.

* * * * *